United States Patent
Brennan

(10) Patent No.: US 12,034,325 B1
(45) Date of Patent: Jul. 9, 2024

(54) METHOD AND SYSTEM FOR BATTERY MANAGEMENT INCLUDING BYPASSING BATTERY CELLS IN A BATTERY PACK

(71) Applicant: Sol-Ark, LLC, Allen, TX (US)

(72) Inventor: Thomas Joseph Brennan, Richardson, TX (US)

(73) Assignee: SOL-ARK, LLC, Allen, TX (US)

( * ) Notice: Subject to any disclaimer, the term of this patent is extended or adjusted under 35 U.S.C. 154(b) by 0 days.

(21) Appl. No.: 18/209,279

(22) Filed: Jun. 13, 2023

(51) Int. Cl.
- *H02J 7/00* (2006.01)
- *H01M 10/44* (2006.01)
- *H01M 10/46* (2006.01)

(52) U.S. Cl.
CPC .......... *H02J 7/0031* (2013.01); *H01M 10/44* (2013.01); *H01M 10/46* (2013.01); *H02J 7/0048* (2020.01)

(58) Field of Classification Search
USPC ........................................................ 320/122
See application file for complete search history.

(56) References Cited

U.S. PATENT DOCUMENTS

| | | | |
|---|---|---|---|
| 5,880,575 A * | 3/1999 | Itou ................. | H02J 7/0013 320/122 |
| 11,128,153 B1 | 9/2021 | Cho et al. | |
| 2006/0139004 A1 * | 6/2006 | Uesugi ................. | H02J 7/0016 320/132 |
| 2013/0278218 A1 * | 10/2013 | Onnerud ............... | H02J 7/0016 320/118 |

FOREIGN PATENT DOCUMENTS

GB 2601017 A 5/2022

OTHER PUBLICATIONS

PCT/US2023/072350, "International Search Report and Written Opinion", Sep. 26, 2023, 8 pages.

\* cited by examiner

*Primary Examiner* — Samuel Berhanu
(74) *Attorney, Agent, or Firm* — Kilpatrick Townsend & Stockton LLP

(57) ABSTRACT

A system can include a battery pack with battery cell sections connected in series, where each of the battery cell sections includes a battery cell and a bypass switch. The system can also include a control circuit. The control circuit can determine a capacity of a particular battery cell in a particular battery cell section, determine that the capacity of the particular battery cell is less than a predefined threshold, and in response, execute a bypass sequence for the particular battery cell. The bypass sequence can involve determining a bypass period for which to bypass the particular battery cell based on the capacity of the particular battery cell, and transmitting a bypass signal to a drive circuit. The drive circuit can receive the bypass signal and responsively operate the bypass switch of the particular battery cell section to bypass the particular battery cell for the bypass period.

18 Claims, 9 Drawing Sheets

METHOD AND SYSTEM FOR BATTERY MANAGEMENT INCLUDING BYPASSING BATTERY CELLS IN A BATTERY PACK

BACKGROUND OF THE INVENTION

The development of rechargeable batteries, for example, lithium ion batteries, has opened up new applications in a variety of industries. Rechargeable batteries offer a number of advantages in applications benefiting from long operating times and extended battery cycle life. Typically, charging and discharging of rechargeable batteries utilizes specific charge and discharge criteria. As a result, a battery management system can be utilized to manage battery operation for the health and safe operation of the batteries.

Despite the progress made in the areas of rechargeable batteries and battery management systems, there is a need in the art for improved methods and systems related to rechargeable batteries and battery management systems.

SUMMARY OF THE INVENTION

The present application generally relates to methods and systems related to a battery management system for managing the charging and discharging of a battery pack. More particularly, embodiments of the present invention relate to a battery management system that can be used to monitor a battery pack and automatically and selectively bypass specific battery cells (e.g., deficient or defective battery cells) in a battery pack. The invention is applicable to a variety of high-voltage and low-voltage applications involving multi-cell battery packs utilized in a variety of applications including automotive and solar storage.

The battery pack can include any number of battery cell sections connected in series, where each battery cell section includes a battery cell, a charging (or discharging) switch, and a bypass switch. A control circuit of the battery management system can monitor the voltage across the battery cell in each battery cell section over the course of one or more charging cycles. Based on the rate of change in the voltage across a battery cell (e.g., as compared to the current profile of the battery), the control circuit can determine the capacity of the battery cell. If the control circuit determines that the capacity of a particular battery cell is less than a predefined threshold, it may mean that the battery cell is a deficient or defective cell that should be bypassed. Accordingly, the control circuit can determine a bypass period for which to bypass the particular battery cell during a charging (and discharging) cycle. The control circuit can determine the bypass period based on the capacity of the particular battery cell. The control circuit can then open the charging switch and close the bypass switch of the corresponding battery cell section to bypass the particular battery cell for the bypass period. In this way, the control circuit can automatically monitor the capacity of various battery cells in a battery pack over time and dynamically bypass deficient or defective battery cells for a bypass period, to reduce or minimize the negative impact of the deficient or defective battery cells on the charging process. Similar principles can be applied during a discharge cycle to reduce or minimize the negative impact of the deficient or defective battery cells on a discharging process.

The battery management system described herein can overcome the problems associated with traditional balancing methods, which are normally lossy, slow, implemented in hardware, and require expensive high-voltage power transistors. For example, the battery management system described herein can selectively bypass deficient or defective battery cells for certain time intervals particular to every cycle of charging/discharging, which means that there is no need to implement traditional balancing methods that use expensive charge-equalization circuitry. Additionally, the battery management system can execute software on a controller to keep track of the capacity of each battery cell while adaptively deciding which of the battery cells to bypass and for what time interval. By using a software-controlled method to adaptively bypass deficient or defective cells rather than using expensive hardware to implement traditional balancing methods, some examples can be cost effective and have a smaller footprint on a printed circuit board than traditional balancing methods.

Some examples described herein can further reduce or minimize cost and bypass losses by using a power control switch to isolate the battery pack, before operating the charge and bypass switches to bypass deficient or defective cells. The power control switch can be a high-voltage power transistor that may have high resistivity to protect the battery cells from high inrush current. More specifically, the battery management system can open the power control switch to isolate the battery pack, and then operate the charge switch and the bypass switch associated with a battery cell to bypass the battery cell, before finally closing the power control switch to reestablish power flow to the battery pack. Using these techniques, low-voltage transistors can be used as the charge and bypass switches. This can reduce costs as compared to traditional balancing methods that utilize a large number of expensive high-voltage power transistors.

The battery management system can further enable a user to be fully aware of the status of the battery pack by outputting a classification and/or a capacity of each battery cell to the user using any suitable communication means, such as Modbus, controller area network (CAN), Ethernet, or wireless communication. This can allow the user to take any necessary corrective action, such as replacing a battery under warranty if a large number of battery cells are defective. These, and other embodiments of the present invention, along with many of its advantages and features, are described in more detail in conjunction with the text below and attached figures.

According to one embodiment of the present invention, a system can include a battery pack having battery cell sections connected in series. Each of the battery cell sections includes a battery cell and a bypass switch. The bypass switch can be positioned in parallel with the battery cell. The bypass switch is operable to short circuit both ends of the battery cell section. The system also includes a control circuit. The control circuit is configured to: determine a capacity of a particular battery cell in a particular battery cell section among the battery cell sections; determine whether the capacity of the particular battery cell is less than a predefined threshold; and in response to determining that the capacity of the particular battery cell is less than the predefined threshold, execute a bypass sequence for the particular battery cell. The bypass sequence involves determining, based on the capacity of the particular battery cell, a bypass period for which to bypass the particular battery cell. The bypass sequence also involves transmitting a bypass signal to a drive circuit. The drive circuit can be configured to receive the bypass signal and responsively operate the bypass switch of the particular battery cell section to bypass the particular battery cell for the bypass period.

Another embodiment of the present invention includes a method executed by a control circuit. The method can include determining a capacity of a particular battery cell in a particular battery cell section of a battery pack, wherein the particular battery cell section includes a bypass switch. The method can include determining whether the capacity of the particular battery cell is less than a predefined threshold. The method can include, in response to determining that the capacity of the particular battery cell is less than the predefined threshold, executing a bypass sequence for the particular battery cell. The bypass sequence involves determining, based on the capacity of the particular battery cell, a bypass period for which to bypass the particular battery cell. The bypass sequence also involves transmitting a bypass signal to a drive circuit. The drive can circuit be configured to receive the bypass signal and responsively close the bypass switch of the particular battery cell section to bypass the particular battery cell for the bypass period.

Yet another embodiment of the present invention includes a method executed by a first control circuit associated with a first battery pack. The method can include determining that a battery cell of the first battery pack is to be bypassed for a bypass period based on a capacity of the battery cell. The method can include, in response to determining that the battery cell is to be bypassed for the bypass period: executing a first bypass sequence configured to bypass the battery cell for the bypass period, and transmitting a bypass notification to a second control circuit associated with a second battery pack. The second control circuit is configured to receive the bypass notification. In response to receiving the bypass notification, the second control circuit can synchronize a second bypass sequence with the first bypass sequence. The second bypass sequence can be configured to bypass another battery cell in the second battery pack.

BRIEF DESCRIPTION OF THE DRAWINGS

Aspects of the present disclosure now will be described more fully hereinafter with reference to the accompanying drawings, which are intended to be read in conjunction with both this summary, the detailed description and any preferred and/or particular embodiments specifically discussed or otherwise disclosed. The various aspects may, however, be embodied in many different forms and should not be construed as limited to the embodiments as set forth herein; rather, these embodiments are provided by way of illustration only and so that this disclosure will be thorough, complete, and will fully convey the full scope to those skilled in the art.

DETAILED DESCRIPTION OF SPECIFIC EMBODIMENTS

The present invention relates generally to methods and systems related to a battery management system for managing the charging and discharging of a battery pack. More particularly, embodiments of the present invention provide methods and systems useful for automatically and selectively bypassing deficient or defective battery cells in a battery pack. The invention is applicable to a variety of high-voltage and low-voltage applications involving multicell battery packs, such as automotive and solar storage.

A battery pack (e.g., a lithium ion battery pack) will have multiple battery cells connected in series. Over multiple cycles of charging and discharging, some battery cells may become weaker than others. This may be due to manufacturing variances, assembly variances, cell aging, impurities, environment exposure, etc. These weak cells have less capacity to hold charge than normal healthier cells, and therefore the weak cells may charge and discharge at a faster rate than healthy cells. Some battery cells may also fail altogether. These bad cells cannot hold any charge at all. Because the deficient or defective cells (e.g., weak and bad cells) are connected in series with the other healthy cells, they may prevent the battery pack from fully charging. In some cases, a bad cell can render the entire battery pack inoperable, such that the battery pack cannot be charged or discharged at all.

Battery management systems can be used to help address the fact that some battery cells may be weaker than others in a battery pack, which can negatively impact charging and discharging of the battery pack. Traditional battery management systems may employ balancing methods to maintain an equivalent state-of-charge (SOC) in every battery cell, to the degree possible given their different capacities, over the widest possible range. But there are a variety of problems with traditional battery balancing methods, both in terms of their effectiveness and cost. Accordingly, embodiments of the present invention provide improved methods and systems related to battery cells in a battery pack and attendant battery management systems.

Figure 1:
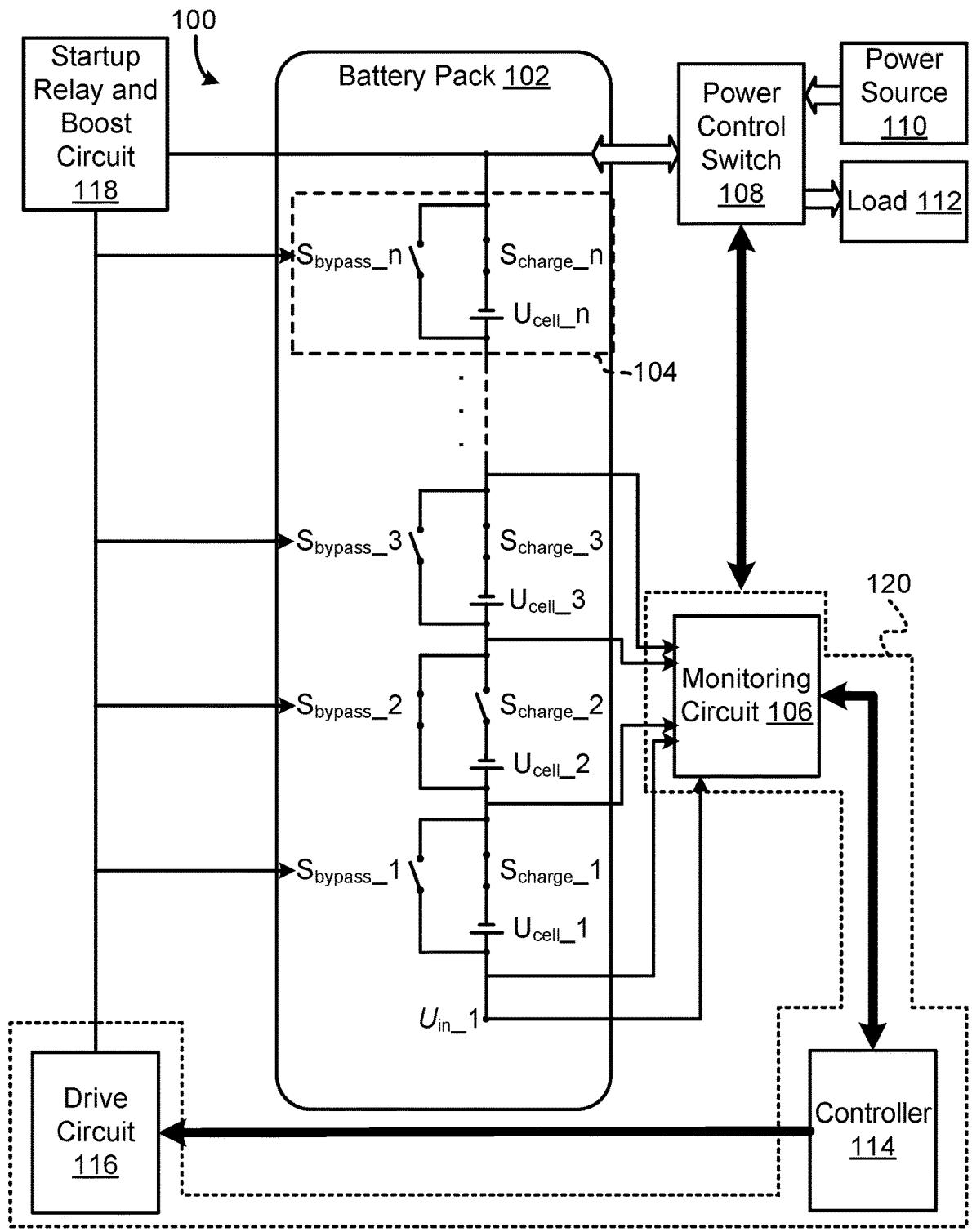
FIG. 1 shows a block diagram of an example of a battery management system according to some aspects of the present disclosure.

FIG. 1 shows a block diagram of an example of a battery management system 100 according to some aspects of the present disclosure. The battery management system 100 includes a battery pack 102 with n battery cells (e.g., 128 battery cells), represented as $U_{cell\_1}$-$U_{cell\_n}$ in the figure. The battery cells are connected in series and disposed within the physical housing of the battery pack 102.

Within the battery pack 102, there are also n battery cell sections, such as battery cell section 104, each of the n battery cell sections corresponding to one of the n battery cells. Each battery cell section can include a charging switch, which is designated as $S_{charge}$ in FIG. 1. Examples of the charging switch can include a relay or a transistor, such as a low-voltage transistor. A low-voltage transistor can be a transistor that is designed to handle low voltages, e.g., 50 VDC or less. The charging switch is connected in series with the battery cell and operable between closed and open positions. In the closed position, the charging switch can allow current flow to the battery cell during a charging cycle or from the battery cell during a discharging cycle. In the open position, the charging switch can prevent current flow to the battery cell during a charging cycle or from the battery cell during a discharging cycle.

Each battery cell section can also include a bypass switch, which is designated as $S_{bypass}$ in FIG. 1. Examples of the bypass switch can include a relay or a transistor, such as a low-voltage transistor. The bypass switch can be connected in parallel with the battery cell and the charging switch. The bypass switch is operable between closed and open positions. In the closed position, the bypass switch can short circuit the ends of the battery cell section. This can prevent current flow through the rest of the battery cell section, which in turn can prevent current flow to the battery cell during a charging cycle or from the battery cell during a discharging cycle. In the open position, the bypass switch can allow current flow through the rest of the battery cell section.

The bypass switches and charging switches can be controlled by a control circuit 120 to selectively bypass one or more battery cells (e.g., weak battery cells) during a charging cycle or a discharging cycle of the battery pack 102. More specifically, the control circuit 120 can detect the voltage across a battery cell, determine a capacity of the battery cell based on the voltage, and determine whether the battery cell is a deficient or defective cell based on the capacity. If the battery cell is a deficient or defective cell, the control circuit 120 can determine a bypass period for which to bypass the battery cell. The control circuit 120 can then operate the battery cell's bypass switch and charging switch to selectively bypass the battery cell for the bypass period. The control circuit 120 can perform this process with respect to some or all battery cells, to selectively and individually bypass deficient or defective battery cells during a charging cycle or a discharging cycle of the battery pack 102. In some examples, at least one battery cell is configured to always be enabled to act as the power supply to the control circuit 120. Alternatively, the control circuit 120 may be powered by the power source 110.

To implement the above functionality, the control circuit 120 can include a monitoring circuit 106. The monitoring circuit 106 can be configured to measure the voltage across each battery cell in the battery pack 102. For example, the monitoring circuit 106 include a voltage sensor that is electrically coupled to the positive and negative terminals of a battery cell, to measure the voltage across the battery cell. The monitoring circuit 106 can be configured to take voltage measurements across each battery cell at a predefined frequency. For example, the monitoring circuit 106 can measure the voltage across each battery cell every 10 milliseconds, 100 milliseconds, 1 second, 3 seconds, etc., depending on the configuration. The monitoring circuit 106 can be electrically coupled to a controller 114 and transmit measurement signals indicating the measured voltages to the controller 114.

The controller 114 can include a processor and a memory, examples of each of which are described more fully below. The memory can include instructions that are executable by the processor to perform operations. The controller 114 can receive the measurement signals from the monitoring circuit 106 and store the measured voltages in memory. The controller 114 can analyze the measured voltages associated with each individual battery cell over time to determine how the voltage of each battery cell changes over time. For example, the controller 114 can monitor the voltage across a battery cell over the course of one or more charging cycles to determine how the voltage across the battery cell changes over the charging cycle(s). Based on the measured voltages, the controller 114 can determine the speed at which each battery cell charges and/or discharges. For example, the controller 114 can analyze the measured voltages associated with $U_{cell\_3}$ over the course of one or more charging cycles to determine the speed at which it reaches its fully charged voltage level, e.g., its maximum voltage level. Because the charging speed is related to the battery cell's capacity, the controller 114 can determine the capacity of each battery cell based on its charging speed. For example, the controller 114 can determine the capacity of $U_{cell\_3}$ based on its charging speed. Battery cells with lower capacity (e.g., deficient or defective cells) can charge up significantly faster than healthy battery cells.

After determining the capacity of each battery cell, the controller 114 can determine whether each battery cell's capacity is greater than or equal to a first predefined threshold (e.g., 90% capacity), which may be preprogrammed into the controller 114. If the capacity of a battery cell is greater than or equal to the first predefined threshold, then the battery cell is a healthy battery cell that may not need to be bypassed during the charging cycle. If the capacity of a battery cell is less than the first predefined threshold, it may mean that the battery cell is deficient or defective. That is, the battery cell may be a weak cell or a bad cell. It may be desirable to bypass deficient or defective cells for at least a portion of the charging cycle to mitigate their impact on the charging process.

If the controller 114 determines that a battery cell has a capacity that is less than the first predefined threshold, the controller 114 may next determine whether battery cell is a deficient or defective cell. To do so, the controller 114 can determine whether the capacity of the battery cell is less than a second predefined threshold (e.g., 60%). The second predefined threshold may also be preprogrammed into the controller 114. If the capacity of a battery cell is greater than or equal to the second predefined threshold, then the controller 114 can classify the battery cell as a weak (i.e., a deficient) cell. If the capacity of a battery cell is less than the second predefined threshold, then the controller 114 can classify the battery cell as a bad (i.e., defective) cell.

If the controller 114 determines that a battery cell is a weak cell, the controller 114 can determine a length of time for which to bypass the battery cell during a charging cycle. This length of time is referred to herein as a bypass period. The controller 114 can determine the bypass period based on the capacity of the battery cell. In some examples, the length of the bypass period can be inversely proportional to the capacity of the battery cell, so that as the cell's capacity decreases, the bypass period increases. For example, the length of the bypass period can correspond to the difference between full cell capacity and the calculated capacity of the battery cell. For instance, if the battery cell is at 75% capacity, then the difference would be 100% capacity−75% capacity=25%. In this scenario, the bypass period would correspond to 25% of the charging cycle. Thus, if the charging cycle lasts 100 nanoseconds (100 ns), the bypass period would be 25 ns, which is only a portion of the full 100 ns charging cycle. On the other hand, if the controller 114 determines that a battery cell is a bad cell, the controller 114 can determine that the battery cell should be bypassed for the entire charging cycle. In this case, the controller 114 can determine that the bypass period corresponds to the length of the entire charging cycle. That way, the bad cell will not negatively affect charging of the battery pack 102.

After determining a bypass period for a deficient or defective cell, the control circuit 120 can execute a bypass sequence to implement the bypass period with respect to the battery cell. For example, if the control circuit 120 determines that battery cell $U_{cell\_2}$ should be bypassed for 30 ns, the control circuit 120 can execute a bypass sequence to bypass the battery cell for 30 ns. The bypass sequence may involve opening $S_{charge\_2}$ and closing $S_{bypass\_2}$, as shown in FIG. 1, which can disrupt current flow to the battery cell for the bypass period. When the bypass period is complete, the control circuit 120 can execute an activation sequence to reactivate the battery cell. The activation sequence may involve closing $S_{charge\_2}$ and opening $S_{bypass\_2}$, which can reestablish current flow to the battery cell.

To operate the bypass switches and the charging switches, the control circuit 120 can include drive circuit 116. The drive circuit 116 can be electrically coupled to the bypass switches and the charging switches. The drive circuit 116 can be configured to apply a drive voltage at the appropriate terminals of the bypass and charging switches to operate the switches. For example, if the bypass switches and the charging switches are transistors, the drive circuit 116 can function as a gate driver configured to apply a drive voltage to the gates (or bases) of the transistors to switch them between open and closed states. The drive circuit 116 can include a multiplexer or other suitable circuitry to selectively and individually control the bypass and charging switches in the battery cell sections.

To generate sufficient voltage to control the bypass switches and the charging switches, the drive circuit 116 can be coupled to a startup relay and boost circuit 118. The startup relay can be electrically coupled to one or more of the battery cells in the battery pack 102, such as battery cells $U_{cell\_1}$-$U_{cell\_3}$. The startup relay can draw power from the connected battery cells to activate a boost circuit. In some examples, the control circuit 120 may keep the connected battery cells active (not bypassed) at all times, so that power is maintained at the boost circuit 118. The boost circuit can include a step-up converter that steps up voltage from its input. Once activated, the boost circuit can generate a drive voltage that is larger than its input voltage. The drive circuit 116 can then apply the drive voltage to the bypass and charging switches of the appropriate battery cells to individually control the switches.

In the control circuit 120, the controller 114 can be electrically coupled to the drive circuit 116. The controller 114 can transmit control signals to the drive circuit 116, where the control signals indicate which battery cell to bypass. The drive circuit 116 can receive the control signals and responsively operate the bypass switch and the charge switch of the corresponding battery cell section to bypass the battery cell. For example, the controller 114 can transmit an open signal to the drive circuit 116 indicating that $S_{charge\_2}$ is to be opened. The drive circuit 116 can receive the open signal and responsively open $S_{charge\_2}$, thereby preventing current flow to the battery cell $U_{cell\_2}$. The controller 114 can also transmit a bypass signal to the drive circuit 116 indicating that $S_{bypass\_2}$ is to be closed. The drive circuit 116 can receive the bypass signal and responsively close $S_{bypass\_2}$, thereby short circuiting the ends of the corresponding battery cell section and preventing current flow to the battery cell $U_{cell\_2}$. As a result, the battery cell $U_{cell\_2}$ can be bypassed. The drive circuit 116 can maintain the switches in these states until it receives additional signals from the controller 114 to reactivate the battery cell. For example, the controller 114 can determine that the 10 ns bypass period has concluded. In response, the controller 114 can transmit additional control signals to the drive circuit 116 for closing $S_{charge\_2}$ and opening $S_{bypass\_2}$. Closing $S_{charge\_2}$ can allow current flow to the battery cell $U_{cell\_2}$, and opening $S_{bypass\_2}$ can prevent bypass of the battery cell $U_{cell\_2}$, thereby reactivating the battery cell.

In some examples, the battery management system 100 can also include one or more power control switches 108 between the battery pack 102 and a power source 110 used to charge the battery pack 102. Examples of the power source 110 can include a solar panel array or an electrical grid. Examples of the power control switch 108 can include a relay or a transistor, such as a high-voltage transistor. A high-voltage transistor can be a transistor that is designed to handle high voltages, e.g., 60 VDC or more. The control circuit 120 (e.g., the controller 114) can operate the one or more power control switches 108 as part of the bypass sequence, so that the bypass switching operations can be safely performed. For example, to bypass the battery cell $U_{cell\_2}$, the control circuit 120 can begin the bypass sequence by transmitting a first open signal to open the power control switch 108, so that the battery cells in the battery pack 102 are electrically floating. The control circuit 120 can next transmit a second open signal to open the charging switch $S_{charge\_2}$. The control circuit 120 can then transmit a first close signal to close the bypass switch $S_{bypass\_2}$. Finally, the control circuit 120 can transmit a second close signal to close the power control switch 108, thereby reestablishing current flow from the power source 110 to the battery pack 102. Through this sequence of steps, the control circuit 120 can safely operate the bypass and charging switches, without the battery cell experiencing an inrush of current from the power source 110.

The control circuit 120 can also operate the power control switch 108 as part of the activation sequence so that the activation switching operations can be safely performed. For example, to reactivate a battery cell $U_{cell\_2}$, the control circuit 120 can begin the bypass sequence by transmitting a first open signal to open the power control switch 108, so that the battery cells in the battery pack 102 are floating. The control circuit 120 can next transmit a first close signal to close the charging switch $S_{charge\_2}$. The control circuit 120 can then transmit a second open signal to open the bypass switch $S_{bypass\_2}$. Finally, the control circuit 120 can transmit a second close signal to close the power control switch 108, thereby reestablishing current flow from the power source 110 to the battery pack 102. Through this sequence of steps, the control circuit 120 can safely operate the bypass and charging switches.

Using the above techniques, the control circuit 120 can safely and selectively bypass one or more battery cells of a battery pack 102 over the course of a charging cycle. This can significantly extend the life of the battery pack 102, for example by reducing the impact of weak and bad cells on the charging and discharging of the battery pack 102.

Similar principles can also be applied to discharging the battery pack 102. For example, the battery pack 102 may be coupled to a load 112 (e.g., a motor or a home appliance) for powering the load 112. During the discharging cycle, the control circuit 120 can measure voltages across a battery cell, determine a capacity of the battery cell based on the measured voltages, and determine whether the battery cell is a deficient or defective cell based on the capacity. If the battery cell is a deficient or defective cell, the control circuit 120 can determine a bypass period for which to bypass the battery cell. The control circuit 120 can then operate the battery cell's bypass switch and charging switch (and optionally the power control switches 108) to selectively bypass the battery cell for the bypass period. The control circuit 120 can perform this process with respect to each battery cell, to selectively bypass deficient or defective battery cells during a discharging cycle.

It will be appreciated that although certain functions were ascribed to the monitoring circuit 106, the controller 114, and the drive circuit 116 in the above description, these are intended to be illustrative and non-limiting. In other examples, the functionality described above may be apportioned differently between those components. For instance, the controller 114 can be configured to perform one or more of the functions of the monitoring circuit 106 described above. In some such examples, the controller 114 can include the monitoring circuit 106. Thus, these may not necessarily be separate components in the control circuit 120. As another example, the monitoring circuit 106 can be configured to perform one or more of the functions of the controller 114 described above. For instance, the monitoring circuit 106 may determine the capacity of each battery cell and transmit signals indicating the respective capacity of each battery cell to the controller 114.

Figure 2:
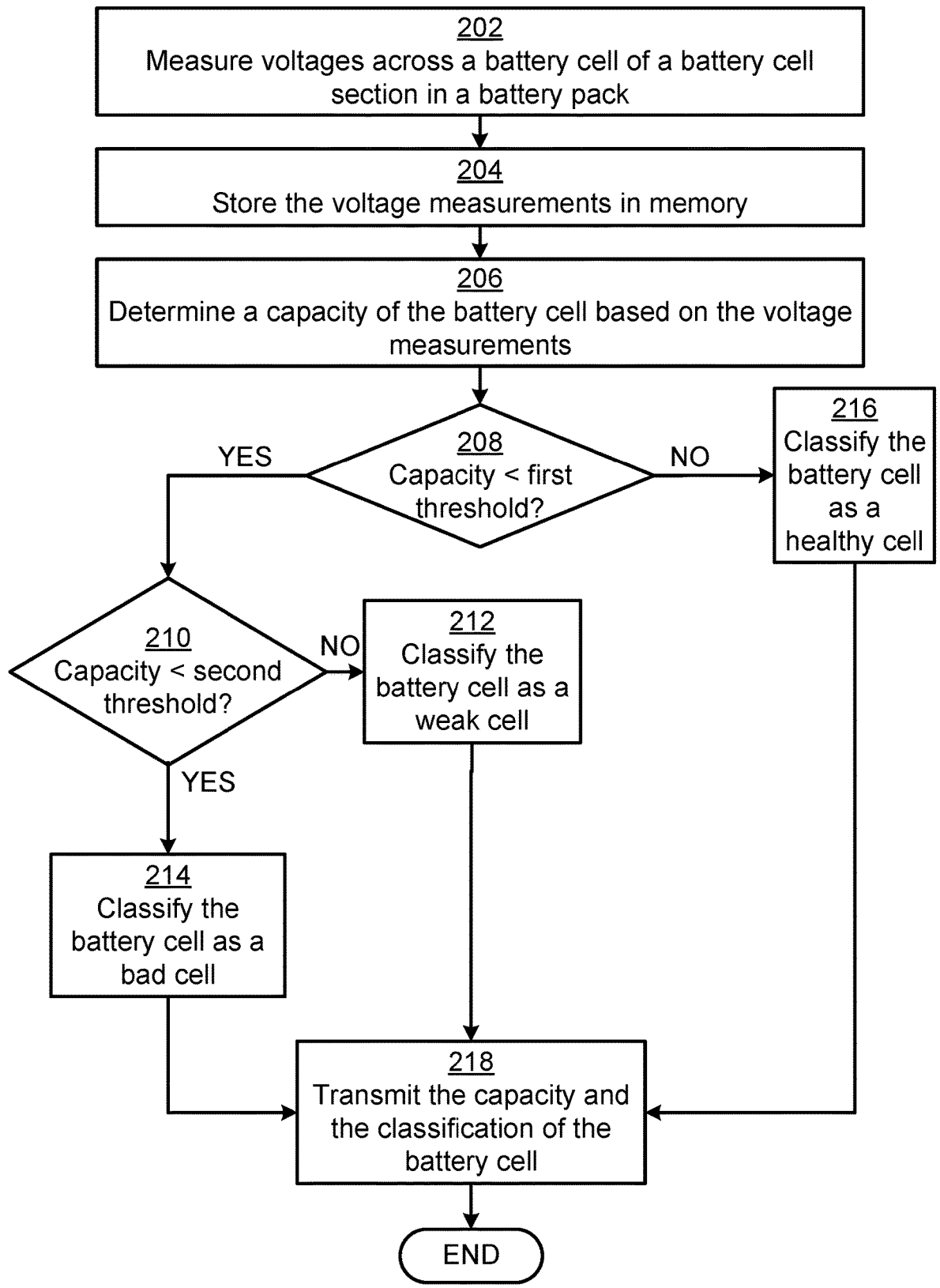
FIG. 2 shows a flowchart of an example of a process for classifying a battery cell as a healthy cell, a weak cell, or a bad cell according to some aspects of the present disclosure.
Figure 3:
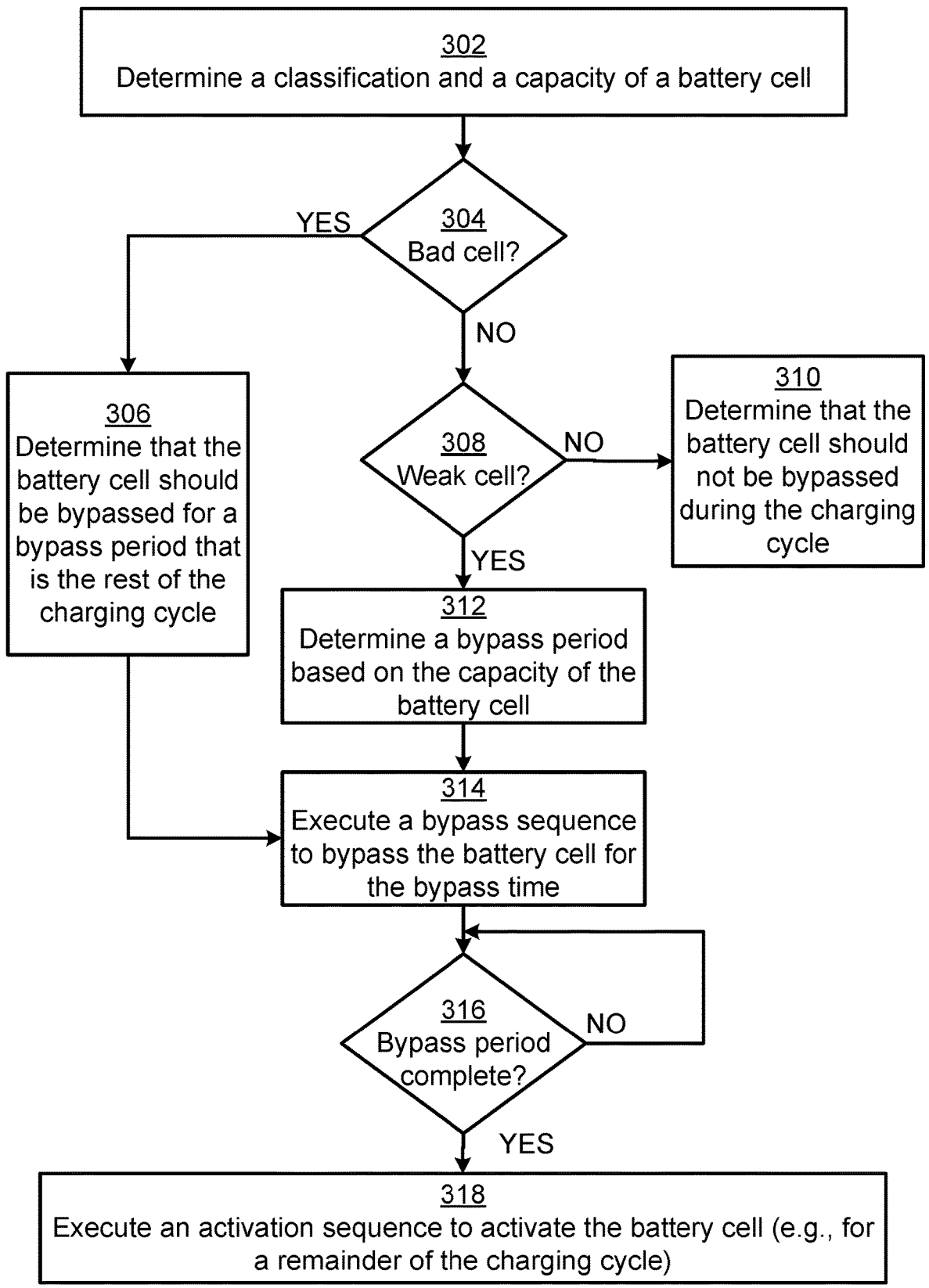
FIG. 3 shows a flowchart of an example of a process for bypassing a battery cell for a bypass period according to some aspects of the present disclosure.
Figure 4:
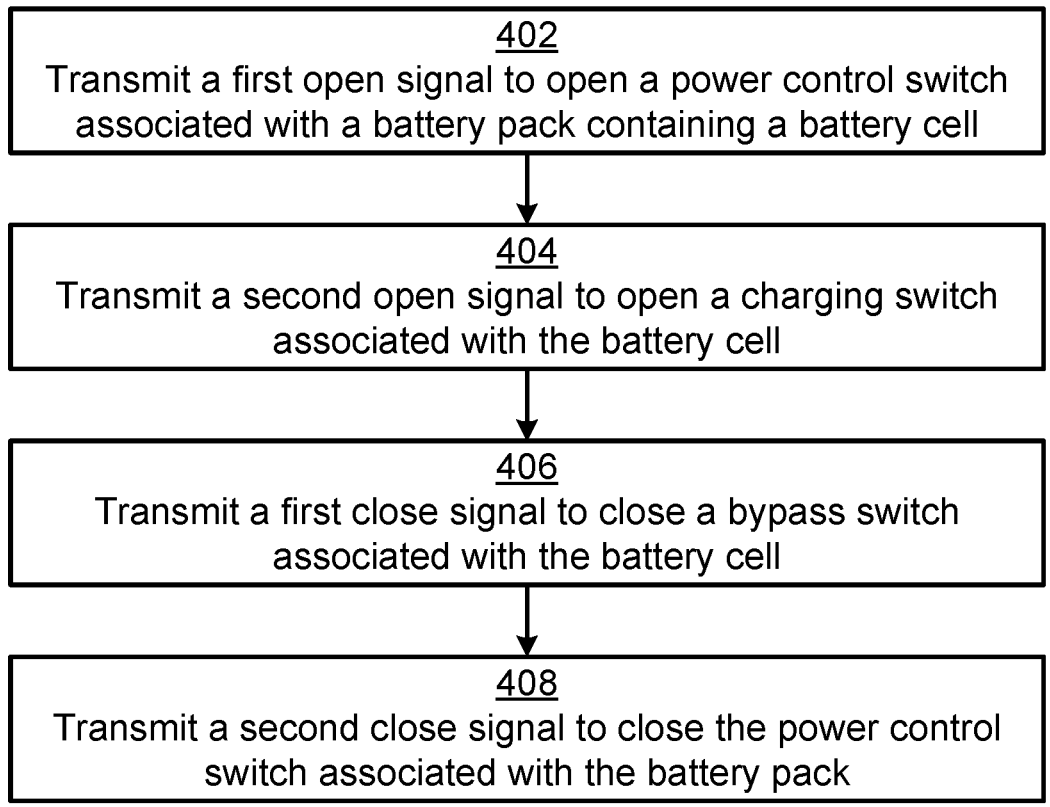
FIG. 4 shows a flowchart of an example of a cell bypass sequence according to some aspects of the present disclosure.

Various aspects described above will now be further explained with respect to FIGS. 2-4, which are intended to be illustrative and non-limiting. Other examples may include more operations, fewer operations, different operations, or a different sequence of operations than is shown in each of those figures. The operations of FIGS. 2-4 are described below with reference to the components of FIG. 1 and, for simplicity, the operations are described as being performed by the control circuit 120. But it should be understood that this means that the operations can be performed by one or more components of the control circuit 120.

Specifically, FIG. 2 shows a flowchart of an example of a process for classifying a battery cell as a healthy cell, a weak cell, or a bad cell according to some aspects of the present disclosure. The process begins at block 202. In block 202, the control circuit 120 measures voltages across a battery cell $U_{cell\_n}$ in a battery cell section 104 of a battery pack 102. For example, the control circuit 120 can include a monitoring circuit 106 configured to periodically measure the voltage across the battery cell. The voltage measurements can be taken at a predefined frequency, which can be preconfigured in the monitoring circuit 106, over the course of a charging cycle or discharging cycle.

In block 204, the control circuit 120 stores the voltage measurements in memory. For example, the controller 114 can store the voltage measurements in an internal memory or an attached memory. The memory can be a non-volatile memory that is configured to retain the voltage data after being powered off. In this way, the control circuit 120 can store voltage data associated with each individual battery cell over the course of one or more charging cycles and/or discharging cycles.

In some examples, the control circuit 120 can additionally or alternatively determine the charge state of the battery cell $U_{cell\_n}$. The charge state, which is also referred to herein as the State of Charge (SoC), is the level of charge of the battery cell relative to its capacity. The charge state can be expressed as a percentage, such as 0% for empty and 100% for full. The charge state of the battery cell can be determined based on a voltage measurement or a current measurement, which may be obtained using a current sensor of the control circuit 120. For example, the charge state of the battery cell can be determined based on a voltage measurement by using a known discharge curve (voltage vs. charge state) of the battery cell. After determining the charge state for the battery cell, the control circuit 120 can store the charge state in memory. The control circuit 120 can repeat this process, for example each time it takes a voltage or current measurement, to generate charge-state data indicating how the charge state of the battery cell changed over time. Using these techniques, the control circuit 120 can store charge-state data associated with each individual battery cell over the course of one or more charging cycles and/or discharging cycles.

In block 206, the control circuit 120 determines a capacity of the battery cell $U_{cell\_n}$ based on the voltage measurements. For example, the controller 114 can retrieve stored voltage measurements from memory and analyze their rate of change to determine a charging rate of the battery cell. Based on the charging rate and a known charging current, which may also be measured by the battery management system 100 using a current sensor (e.g., in the monitoring circuit 106), the controller 114 can determine the capacity of the battery cell using the equation following:

$$\text{battery capacity} = (\text{charging time}) * (\text{charging current})$$

In some examples, the battery capacity computation can take into account other factors, such as depth of discharge and charge efficiency, for greater accuracy.

In some examples, the control circuit 120 can additionally or alternatively determine the capacity of the battery cell $U_{cell\_n}$ based on its charge-state data. For example, the controller 114 can retrieve stored charge-state data from memory and analyze it to determine the battery cell's capacity at the current point in time.

In block 208, the control circuit 120 determines whether the capacity is less than a first predefined threshold. For example, the controller 114 can compare the capacity to the first predefined threshold to determine whether the capacity is less than the first predefined threshold. If not, the process can proceed to block 216 where the control circuit 120 classifies the battery cell as a healthy cell. Otherwise, the process can proceed to block 210.

In block 210, the control circuit 120 determines whether the capacity is less than a second predefined threshold. For example, the controller 114 can compare the capacity to the second predefined threshold to determine whether the capacity is less than the second predefined threshold. If not, the process can proceed to block 212 where the control circuit 120 classifies the battery cell as a weak cell. Otherwise, the process can proceed to block 214 where the control circuit 120 classifies the battery cell as a bad cell.

In block 218, the control circuit 120 can transmit the capacity and/or the classification of the battery cell. For example, the controller 114 can transmit the capacity and the classification of the battery cell to a user device that is external to the control circuit 120. The user device may be associated with a user or servicer of the battery pack 102. Examples of the user device can include a laptop computer, a desktop computer, a mobile phone such as a smart phone, a wearable device such as a smart watch, a tablet, or an e-reader. The controller 114 can transmit the capacity and the classification to the user device via wired or wireless connection. For example, the controller 114 can transmit the capacity and the classification to the user device via a Bluetooth connection, a WiFi (e.g., 802.11g) connection, or a cellular connection. Transmitting the capacity and the classification of the battery cell to the user device can allow the user to monitor the battery pack 102 for potential problems, for example so that maintenance can be performed.

The above process can be iteratively applied to each battery cell of the battery pack 102. This may allow the control circuit 120 to concurrently monitor the battery cells over time to dynamically detect if and when healthy cells become deficient or defective cells. Deficient or defective cells may then by bypassed for a time period (a bypass period), which can improve the operation of the battery pack 102.

It should be appreciated that the specific steps illustrated in FIG. 2 provide a particular method of classifying a battery cell as a healthy cell, a weak cell, or a bad cell according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 shows a flowchart of an example of a process for bypassing a battery cell for a bypass period according to some aspects of the present disclosure. The process begins at block 302. In block 302, the control circuit 120 determines a classification and a capacity of a battery cell $U_{cell\_n}$ in a battery cell section 104 of a battery pack 102. The classification indicates whether the battery cell is a healthy cell or a deficient or defective cell (e.g., a weak cell or a bad cell). In some examples, the controller 114 can determine the classification based on voltage data associated with the battery cell, where the voltage data is acquired by the monitoring circuit 106 over the course of one or more charging cycles and/or discharging cycles.

In block 304, the control circuit 120 determines, based on the classification, whether the battery cell $U_{cell\_n}$ is a bad cell. If so, the process can proceed to block 306, where the control circuit 120 can determine that the bad cell should be bypassed for the rest of the charging cycle (or the rest of the discharging cycle, in the discharging context). This may involve determining that its bypass period corresponds to the rest of the charging cycle or discharging cycle. If the control circuit 120 determines that the battery cell $U_{cell\_n}$ is not a bad cell, the process can proceed to block 308.

In block 308, the control circuit 120 determines, based on the classification, whether the battery cell $U_{cell\_n}$ is a weak cell. If not, it may mean that the battery cell is a healthy cell, so the process can proceed to block 310. In block 310, the control circuit 120 determines that the battery cell should not be bypassed during the charging cycle (or the discharging cycle, in the discharging context). If the control circuit 120 determines that the battery cell is a weak cell, the process can proceed to block 312.

In block 312, the control circuit 120 determines a bypass period based on the capacity of the battery cell $U_{cell\_n}$. For example, the control circuit 120 can determine the bypass period based on an inverse relationship between the bypass period and the capacity. In some examples, the control circuit 120 can determine the bypass period using the following equation:

$$\text{Bypass period}=100-\text{Capacity}$$

Of course, other equations may be used in other examples to determine an appropriate bypass period for the battery cell.

In block 314, the control circuit 120 executes a bypass sequence to bypass the battery cell for the bypass period. One example of the bypass sequence is described later on with respect to FIG. 4.

In block 316, the control circuit 120 determines whether the bypass period is complete. For example, the control circuit 120 can detect the end of the bypass period by monitoring a clock or another time tracking device. If the bypass period is still ongoing, the control circuit 120 can wait until the bypass period is complete. If the bypass period is complete, the control circuit 120 can execute an activation sequence a block 318 to activate the battery cell $U_{cell\_n}$ (e.g., for a remainder of the charging cycle or discharging cycle). One example of the activation sequence is described later on with respect to FIG. 5.

In some examples, there may be multiple charging cycles (e.g., duty cycles) over the course of a charging period during which the battery pack 102 is charged. Likewise, there may be multiple discharging cycles (e.g., duty cycles) over the course of a discharging period in which the battery pack 102 is discharged. In either scenario, the control circuit 120 may repeat some or all of blocks 302-318 with respect to each cycle. For instance, in each new charging or discharging cycle, the control circuit 120 may iterate blocks 314-318 to selectively bypass the battery cell for the bypass period during that cycle.

It should be appreciated that the specific steps illustrated in FIG. 3 provide a particular method of bypassing a battery cell for a bypass period according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Now referring to FIG. 4, shown is a flowchart of an example of a bypass sequence according to some aspects of the present disclosure. The bypass sequence can begin at block 402. In block 402, the control circuit 120 transmits a first open signal to open a power control switch 108 associated with a battery pack 102 containing a battery cell $U_{cell\_n}$. For example, the controller 114 can transmit the first open signal to the power control switch 108, where the first open signal is configured to cause the power control switch 108 to switch from a closed state to an open state. As another example, the controller 114 can transmit a control signal to the drive circuit 116, which may be electrically coupled to the power control switch 108. The drive circuit 116 can respond to the control signal by transmitting the first open signal to the power control switch 108, which can cause the power control switch 108 to switch from a closed state to an open state. Opening the power control switch 108 can put the battery pack 102 into an electrically floating state, so that the subsequent switching operations can be safely performed.

In the charging context, in the closed state, the power control switch 108 can allow power flow from a power source 110 to the battery pack 102. And in the open state, the power control switch 108 can prevent power flow from the power source 110 to the battery pack 102. In the discharging context, in the closed state, the power control switch 108 can allow power flow from the battery pack 102 to a load 112. And in the open state, the power control switch 108 can prevent power flow from the battery pack 102 to the load 112.

In block 404, the control circuit 120 transmits a second open signal to open a charging switch $S_{charge\_n}$ associated with the battery cell $U_{cell\_n}$. For example, the controller 114 can transmit the second open signal to the charging switch $S_{charge\_n}$. Alternatively, the controller 114 can transmit a control signal to the drive circuit 116, which can respond to the control signal by transmitting the second open signal to the charging switch $S_{charge\_n}$. The second open signal is configured to cause the charging switch $S_{charge\_n}$ to switch from a closed state to an open state.

In the charging context, in the closed state, the charging switch $S_{charge\_n}$ can allow power flow from the power source 110 to the battery cell $U_{cell\_n}$. And in the open state, the charging switch $S_{charge\_n}$ can prevent power flow from the power source 110 to the battery cell $U_{cell\_n}$. In the discharging context, in the closed state, the charging switch $S_{charge\_n}$ can allow power flow from the battery cell $U_{cell\_n}$ to a load 112. And in the open state, the charging switch $S_{charge\_n}$ can prevent power flow from the battery cell $U_{cell\_n}$ to the load 112.

In block 406, the control circuit 120 transmits a first close signal to close a bypass switch $S_{bypass\_n}$ associated with the battery cell $U_{cell\_n}$. For example, the controller 114 can transmit the first close signal to the bypass switch $S_{bypass\_n}$. Alternatively, the controller 114 can transmit a control signal (e.g., a bypass signal) to the drive circuit 116, which can respond to the control signal by transmitting the first close signal to the bypass switch $S_{bypass\_n}$. The first close signal is configured to cause the bypass switch $S_{bypass\_n}$ to switch from an open state to a closed state. In the open state, the bypass switch $S_{bypass\_n}$ can allow power to flow through the battery cell section 104. In the closed state, the bypass switch $S_{bypass\_n}$ can prevent power flow through the battery cell section.

In block 408, the control circuit 120 transmits a second close signal to close the power control switch 108. For example, the controller 114 can transmit the second close signal to the power control switch 108, where the second close signal is configured to cause the power control switch 108 to switch from an open state to a closed state. Alternatively, the controller 114 can transmit a control signal to the drive circuit 116, which can respond to the control signal by transmitting the second closed signal to the power control switch 108.

It should be appreciated that the specific steps illustrated in FIG. 4 provide a particular method of performing a bypass sequence according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
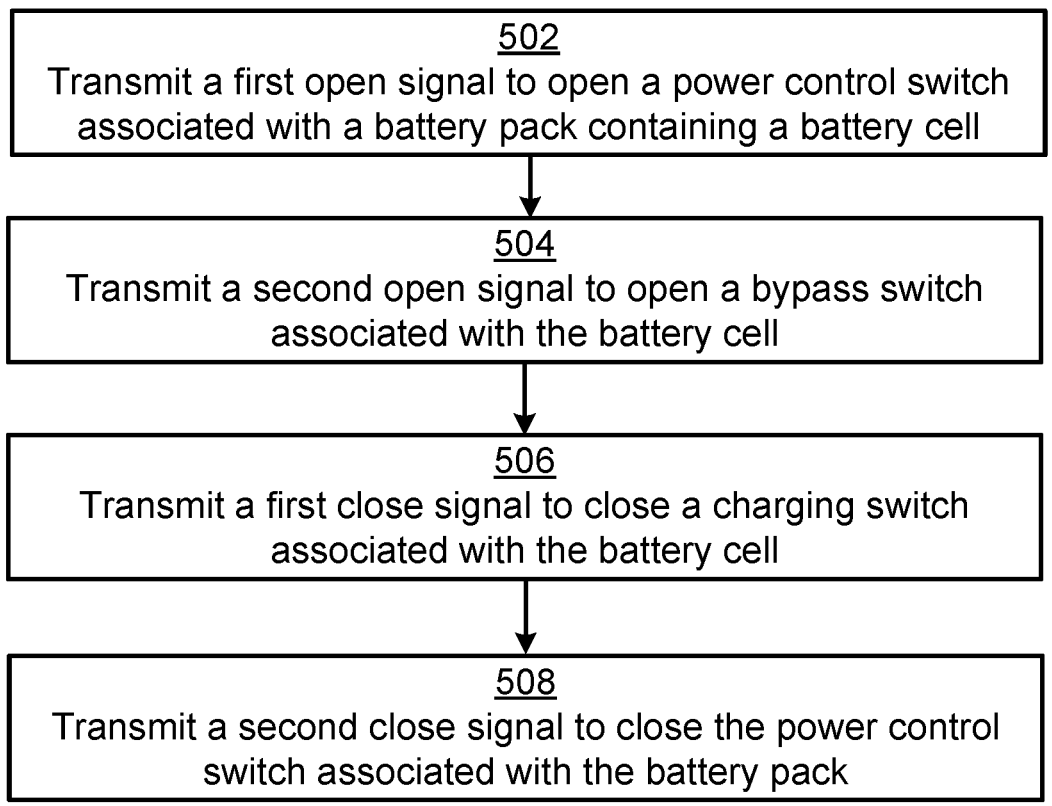
FIG. 5 shows a flowchart of an example of a cell activation sequence according to some aspects of the present disclosure.

FIG. 5 shows a flowchart of an example of an activation sequence according to some aspects of the present disclosure. The activation sequence can begin at block 502. In block 502, the control circuit 120 transmits a first open signal to open a power control switch 108 associated with a battery pack 102 containing a battery cell $U_{cell\_n}$. This operation may be performed using any of the techniques described above. Opening the power control switch 108 can put the battery pack 102 into an electrically floating state, so that the subsequent switching operations can be safely performed.

In block 504, the control circuit 120 transmits a second open signal to open a bypass switch $S_{bypass\_n}$ associated with the battery cell $U_{cell\_n}$. For example, the controller 114 can transmit the second open signal to the bypass switch $S_{bypass\_n}$. Alternatively, the controller 114 can transmit a control signal (e.g., a bypass signal) to the drive circuit 116, which can respond to the control signal by transmitting the second open signal to the bypass switch $S_{bypass\_n}$. The second open signal is configured to cause the bypass switch $S_{bypass\_n}$ to switch from a closed state to an open state.

In block 506, the control circuit 120 transmits a first close signal to close a charging switch $S_{charge\_n}$ associated with the battery cell $U_{cell\_n}$. For example, the controller 114 can transmit the first close signal to the charging switch $S_{charge\_n}$. Alternatively, the controller 114 can transmit a control signal to the drive circuit 116, which can respond to the control signal by transmitting the first close signal to the charging switch $S_{charge\_n}$. The first close signal is configured to cause the charging switch $S_{charge\_n}$ to switch from an open state to a closed state.

In block 508, the control circuit 120 transmits a second close signal to close the power control switch 108. This operation may be performed using any of the techniques described above.

It should be appreciated that the specific steps illustrated in FIG. 5 provide a particular method of performing an activation sequence according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
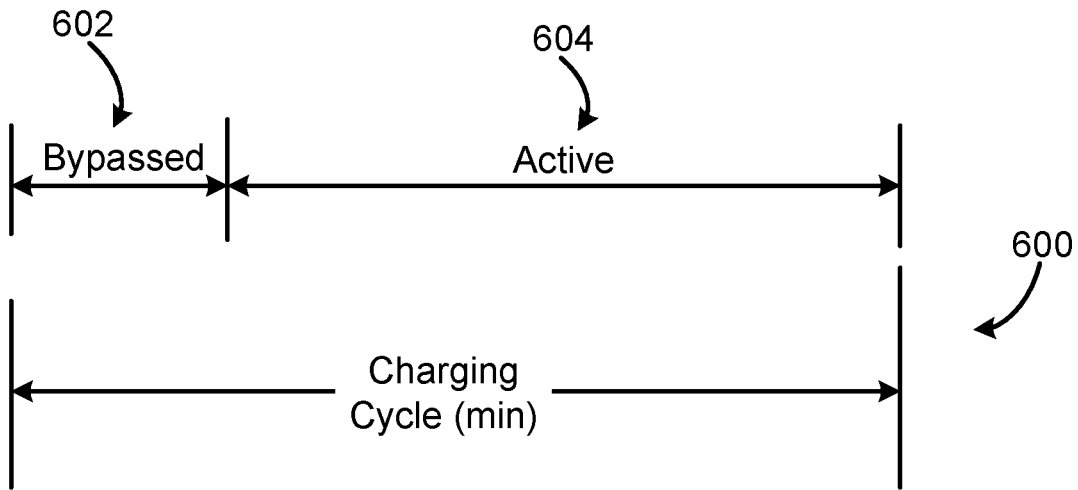
FIG. 6 shows an example of bypass period and an active period associated with a battery cell during a charging cycle according to some aspects of the present disclosure.

FIG. 6 shows an example of bypass period 602 and an active period 604 associated with a battery cell during a charging cycle 600 (e.g., a duty cycle), according to some aspects of the present disclosure. The battery cell is bypassed for the bypass period 602 and active (not bypassed) for the active period 604, which takes up the remainder of the charging cycle 600. Such charging cycles may be repeated any number of times, such as 30-100 times to help keep the bypassed cell in the same state of charge as the active cells.

In this example, the bypass period 602 starts at the beginning of the charging cycle 600. But in other examples, the bypass period 602 can be initiated at any point during the charging cycle 600, as long as there is enough time left in the charging cycle 600 to complete the full bypass period 602 during the charging cycle 600. For example, if the charging cycle is 5 minutes (min) long and the bypass period 602 is 1 min long, the bypass period 602 can be initiated at any point in the charging cycle prior to 4 mins into the charging cycle. As a result, the active period 604 may be bifurcated in the charging cycle 600 and alternate with the bypass period 602.

In some examples, multiple battery packs can be coupled together (e.g., for high-power applications). This may require a specialized configuration of the battery management system to handle the switching operations described above. One example of such a configuration is shown in FIG. 7 and described below.

Figure 7:
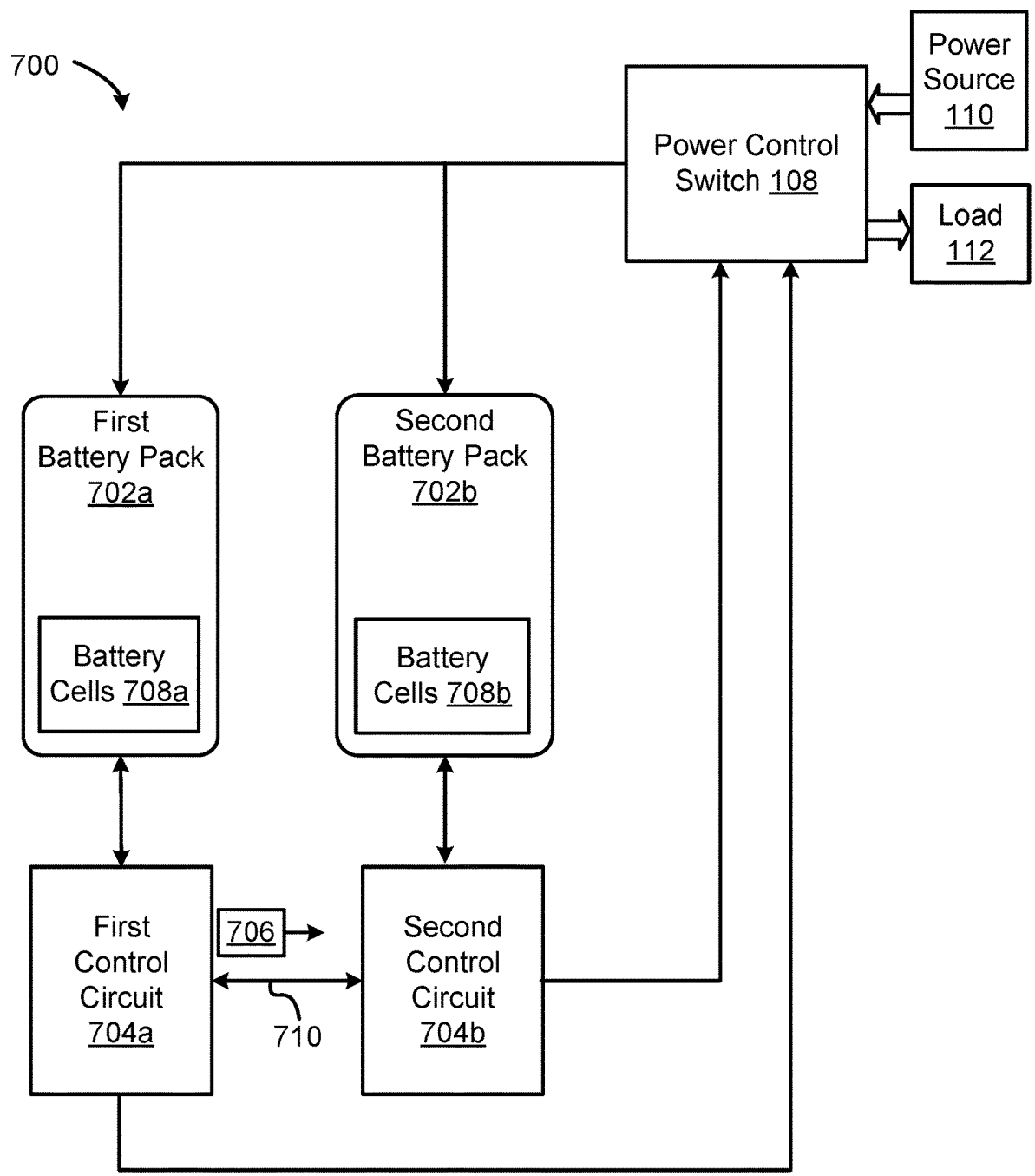
FIG. 7 shows a block diagram of an example of a battery management system for multiple battery packs according to some aspects of the present disclosure.

Referring now to FIG. 7, shown is a battery management system 700 usable to manage multiple battery packs 702a-b according to some aspects of the present disclosure. Although this example involves two battery packs 702*a-b* for simplicity, other examples may involve n battery packs and similar principles can be applied.

In this example, the battery packs 702*a-b* are electrically connected in parallel to one another. Each battery pack can have its own respective control circuit. For example, the first battery pack 702*a* can be electrically coupled to a first control circuit 704*a*, which can include some or all of the components of the control circuit discussed above. The second battery pack 702*b* can also be electrically coupled to a second control circuit 704*b*, which can include some or all of the components of the control circuit discussed above. One or both of the control circuits 704*a-b* can be electrically coupled to one or more power control switches 108, which can control power flow from a power source 110 to the battery packs 702*a-b* or from the battery packs 702*a-b* to a load 112.

Each of the battery packs 702*a-b* can have respective battery cells 708*a-b*, which can be monitored by the respective control circuits 704*a-b* and bypassed using the techniques described above. To bypass of one or more battery cells in one or more battery packs 702*a-b*, in some examples the control circuits 704*a-b* (e.g., their controllers) may communicate with one another to synchronize their switching operations. For example, the first control circuit 704*a* can determine that a first battery cell in the first battery pack 702*a* is to be bypassed for a first bypass period. And, the second control circuit 704*b* can determine that a second battery cell in the second battery pack 702*b* is to be bypassed for a second bypass period, which may be the same as or different than the first bypass period. In response to determining that the first battery cell in the first battery pack 702*a* is to be bypassed for the first bypass period, the first control circuit 704*a* may transmit a bypass notification 706 via a wired or wireless connection 710 to the second control circuit 704*b*. The bypass notification 706 can indicate one or more bypass parameters, such as the start, end, and length of the first bypass period. The second control circuit 704*b* may additionally or alternatively transmit a similar bypass notification to the first control circuit 704*a* indicating one or more bypass parameters, such as a start time, end time, and length of the second bypass period.

Based on one or both of the above communications, the control circuits 704*a-b* can synchronize their bypass sequences so that a first bypass sequence executed by the first control circuit 704*a* at least partially overlaps with a second bypass sequence executed by the second control circuit 704*b*. For example, by control circuits 704*-b* may coordinate their bypass sequences so that the power control switches 108 are only operated (e.g., opened and closed) once for both bypass sequences. Additionally or alternatively, the control circuits 704*a-b* can synchronize their activation sequences so that a first activation sequence executed by the first control circuit 704*a* at least partially overlaps with a second activation sequence executed by the second control circuit 704*b*. For example, by control circuits 704*a-b* may coordinate their activation sequences so that the power control switches 108 are only be operated once for both activation sequences. This can reduce the number of times that the power control switches 108 are operated, which can improve speed and prevent conflicting operation of the power control switches 108.

As one specific example, the first control circuit 704*a* can determine that a first battery cell in the first battery pack 702*a* is to be bypassed for a 10 ns bypass period based on a first capacity of the first battery cell. The second control circuit 704*b* can determine that a second battery cell in the second battery pack 702*b* is to be bypassed for an 8 ns bypass period based on a second capacity of the second battery cell. The first control circuit 704*a* can transmit a bypass notification 706 to the second control circuit 704*b* indicating the 10 ns bypass period. The first control circuit 704*a* can may then initiate a first bypass sequence to implement the 10 ns bypass period (e.g., in response to receiving an acknowledgement communication from the second control circuit 704*b*). The second control circuit 704*b* can receive the bypass notification 706 and determine, based on one or more factors such as the second bypass period being less than the first bypass period, that it will be subordinate to the first control circuit 704*a* in the bypass process. The second control circuit 704*b* can therefore allow the first control circuit 704*a* to operate the power control switches 108 to implement the first bypass sequence, during which time the second control circuit 704*b* can also execute the second bypass sequence (e.g., without attempting to operate the power control switches 108, so that both control circuits 704*a-b* are not attempting to operate the power control switches 108 at the same time). In this way, both control circuits 704*a-b* can synchronize their bypass sequences.

To synchronize their activation sequences, in some examples the second control circuit 704*b* may override the second bypass period with the first bypass period, so that the two bypass periods are the same. For example, the second control circuit 704*b* may determine that the 8 ns bypass period for the second battery cell is shorter than the 10 ns bypass period for the first battery cell. Based on the second bypass period being shorter than the first bypass period, the second control circuit 704*b* can override the 8 ns with the 10 ns bypass period, so that the two bypass periods are the same. As a result, both the first bypass period and the second bypass period should end at approximately the same time. When the first control circuit 704*a* determines that the first bypass period is complete, the first control circuit 704*a* can operate the power control switches 108 to implement the first activation sequence. During that same timeframe, the second control circuit 704*b* can also execute the second activation sequence (e.g., without attempting to operate the power control switches 108). In this way, both control circuits 704*a-b* can synchronize their activation sequences.

The above example, involving bypassing two battery cells in two battery packs 702*a-b*, is relatively simplistic for illustrative purposes. But it will be appreciated that any number of battery cells with the same or different capacities may be selectively bypassed in one or both battery packs 702*a-b* for the same bypass period or different bypass periods. The control circuits 704*a-b* can bidirectionally communicate with one another via the wired or wireless connection 710 to coordinate (e.g., synchronize) the bypass parameters of the bypass periods, to prevent conflicting operation of the one or more power control switches 108 or other problems.

Figure 8:
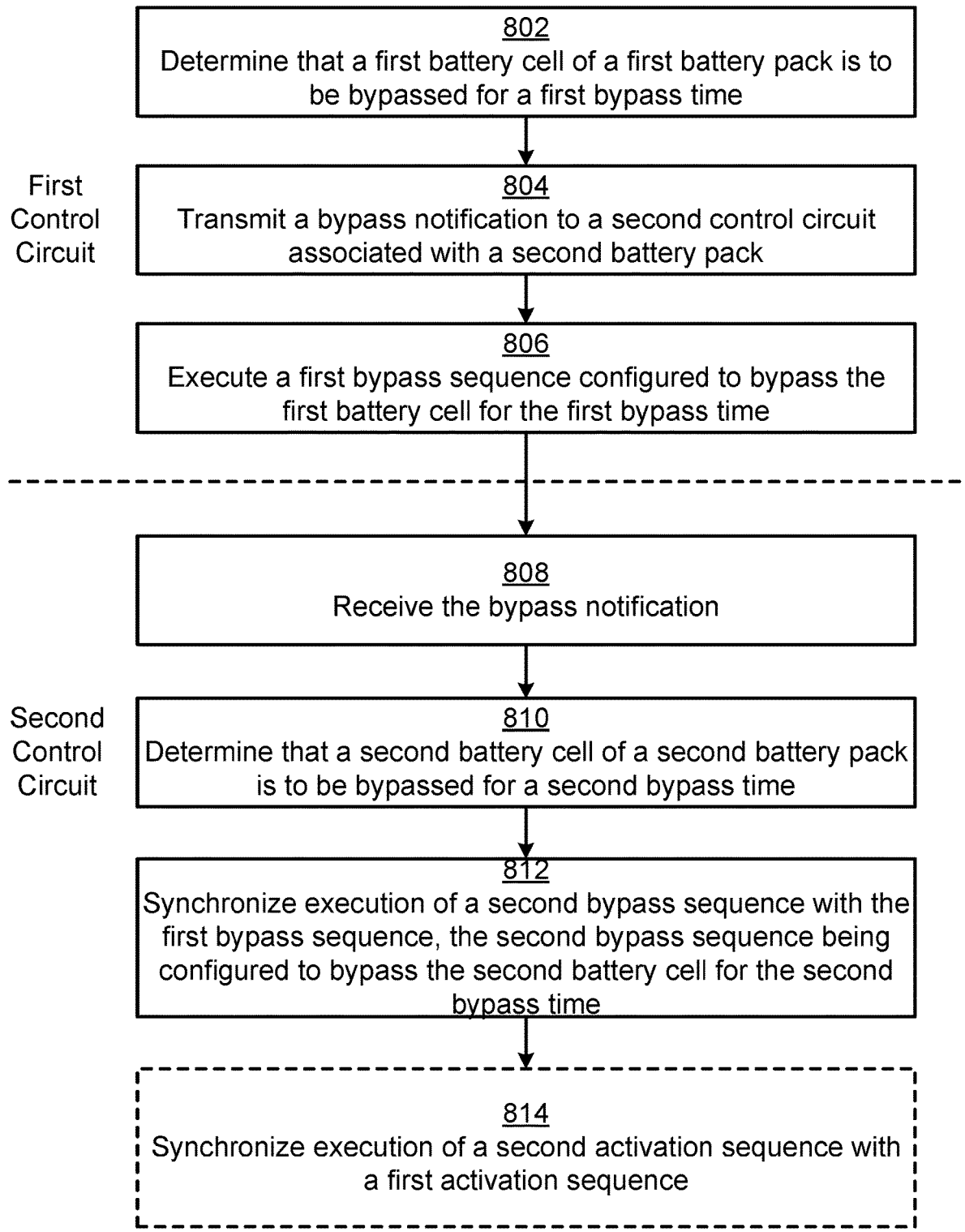
FIG. 8 shows a flowchart of an example of a process for synchronizing bypass sequences among multiple battery packs according to some aspects of the present disclosure.

FIG. 8 shows a flowchart of an example of a process for synchronizing bypass sequences among multiple battery packs according to some aspects of the present disclosure. Other examples may include more operations, fewer operations, different operations, or a different sequence of operations than is shown in FIG. 8. The operations are described below with reference to the components of FIG. 7 and, for simplicity, the operations are described as being performed by the control circuits 704*a-b*. But it should be understood that this means that the operations can be performed by one or more components of the control circuits 704*a-b*.

In block 802, a first control circuit 704*a* associated with a first battery pack 702*a* determines that a first battery cell of the first battery pack 702*a* is to be bypassed for a first bypass period. The first control circuit 704*a* can be electrically coupled to the first battery pack 702*a* for managing charging and discharging of the first battery pack 702. The first control circuit 704*a* can make this determination using any of the techniques described above.

In block 804, the first control circuit 704*a* transmits a bypass notification 706 to a second control circuit 704*b* associated with a second battery pack 702*b*. The second control circuit 704*b* can be electrically coupled to the second battery pack 702*b* for managing charging and discharging of the second battery pack 702*b*. The bypass notification 706 can include one or more bypass parameters associated with the first bypass period. For example, the bypass notification 706 can include a start time and a length associated with the first bypass period. The first control circuit 704*a* can transmit the bypass notification 706 to the second control circuit 704*b* via an electrical connection, such as a bus.

In block 806, the first control circuit 704*a* executes a first bypass sequence to bypass the first battery cell for the first bypass period. An example of the first bypass sequence can be the process described above with respect to FIG. 4.

In block 808, the second control circuit 704*b* receives the bypass notification 706 from the first control circuit 704. The second control circuit 704*b* can extract the bypass parameters, associated with the first bypass sequence, from the bypass notification 706.

In block 810, the second control circuit 704*b* determines that a second battery cell of the second battery pack 702*b* is to be bypassed for a second bypass period, which may be the same as or different than the first bypass period. The second control circuit 704*b* can make this determination using any of the techniques described above.

In block 812, the second control circuit 704*b* synchronizes execution of a second bypass sequence with the first bypass sequence, where the second bypass sequence is configured to bypass the second battery cell for the second bypass period. This may involve synchronizing the first set of bypass parameters associated with the first bypass period with a second set of bypass parameters associated with the second bypass period. For example, the second control circuit 704*b* may adjust (e.g., override) at least one bypass parameter in the second set of bypass parameters based on at least one bypass parameter in the first set of bypass parameters. This adjustment may cause at least a portion of the second bypass sequence to overlap (in time) with the first bypass sequence.

In block 814, the second control circuit 704*b* synchronizes execution of a second activation sequence with a first activation sequence, where the second activation sequence is configured to activate the second battery cell following the second bypass period, and where the first activation sequence is configured to activate the first battery cell following the first bypass period. For example, the second control circuit 704*b* may adjust at least one bypass parameter in the second set of bypass parameters based on at least one bypass parameter in the first set of bypass parameters. This adjustment may cause at least a portion of the second activation sequence to overlap (in time) with the first activation sequence.

It should be appreciated that the specific steps illustrated in FIG. 8 provide a particular method of synchronizing bypass sequences among multiple battery packs according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
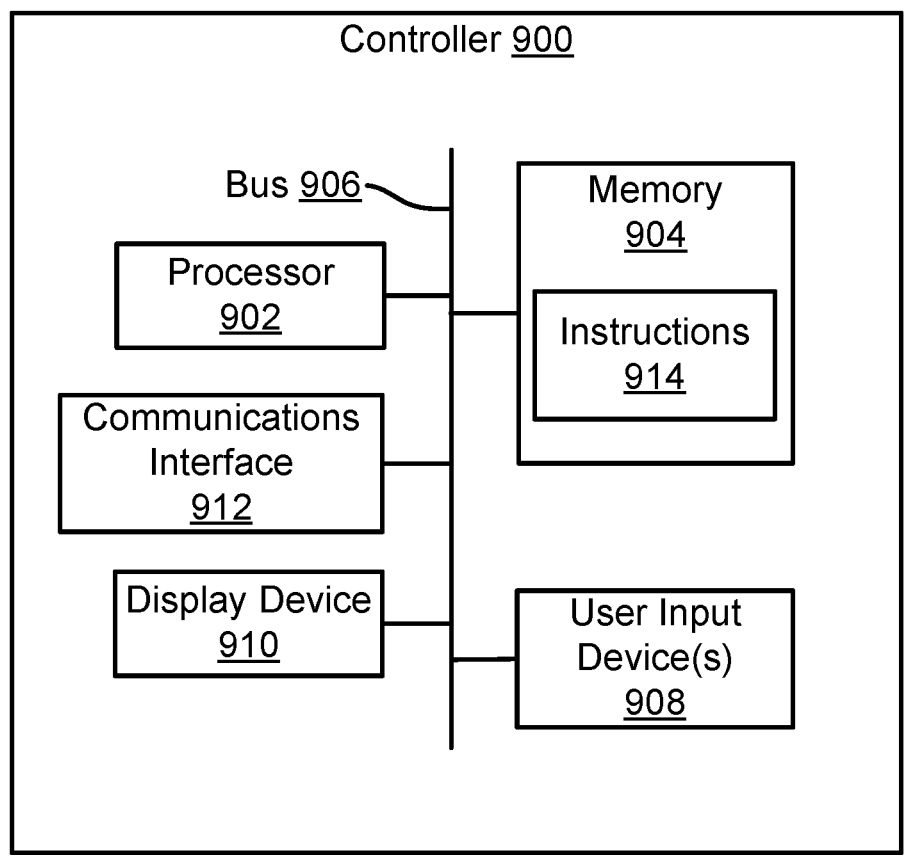
FIG. 9 shows a block diagram of an example of a computing device usable to implement some aspects of the present disclosure.

As alluded to earlier, the control circuits 704*a-b* can each include controllers and other computing devices. Turning now to FIG. 9, a block diagram of an example of a computing device 900 usable to implement some aspects of the present disclosure is shown. In some examples, the computing device 900 may correspond to the controller 114 of FIG. 1.

The computing device 900 includes a processor 902 that is in communication with the memory 904 and other components of the computing device 900 using one or more communications buses 906. The processor 902 is hardware that can include one processing device or multiple processing devices. Examples of the processor 902 can include a Field-Programmable Gate Array (FPGA), an application-specific integrated circuit (ASIC), or a microprocessor. The processor 902 is configured to execute processor-executable instructions 914 stored in the memory 904 to perform one or more processes described herein. The instructions 914 may include processor-specific instructions generated by a compiler or an interpreter from code written in any suitable computer-programming language, such as C, C++, C #, Java, or Python.

The memory 904 is hardware that can include one memory device or multiple memory devices. The memory 904 can be volatile or non-volatile (it can retain stored information when powered off). Examples of the memory 904 include electrically erasable and programmable read-only memory (EEPROM), flash memory, or cache memory. At least some of the memory 904 includes a non-transitory computer-readable medium from which the processor 902 can read instructions 914. A computer-readable medium can include electronic, optical, magnetic, or other storage devices capable of providing the processor 902 with the instructions 914 or other program code. Examples of a computer-readable mediums include magnetic disks, memory chips, ROM, random-access memory (RAM), an ASIC, a configured processor, and optical storage.

The computing device 900 may include one or more user input devices 908 (e.g., a keyboard, mouse, touchscreen, video capture device, and/or microphone) to accept user input and the display device 910 to provide visual output to a user.

The computing device 900 may further include a communications interface 912. In some examples, the communications interface 912 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

It is also understood that the examples and embodiments described herein are for illustrative purposes only and that various modifications or changes in light thereof will be suggested to persons skilled in the art and are to be included within the spirit and purview of this application and scope of the appended claims, which follow.

What is claimed is:

1. A system comprising:
a battery pack having battery cell sections connected in series, wherein each of the battery cell sections includes:
a first terminal and a second terminal;
a battery cell coupled between the first terminal and the second terminal; and
a bypass switch positioned in parallel with the battery cell, wherein the bypass switch is operable to short circuit the first terminal to the second terminal; and
a control circuit configured to:
determine a capacity of a particular battery cell in a particular battery cell section among the battery cell sections;
determine whether the capacity of the particular battery cell is less than a predefined threshold;
in response to determining that the capacity of the particular battery cell is less than the predefined threshold, execute a bypass sequence for the particular battery cell, wherein the bypass sequence involves:
determining, based on the capacity of the particular battery cell, a bypass period for which to bypass the particular battery cell; and
transmitting a bypass signal to a drive circuit, the drive circuit being configured to receive the bypass signal and responsively operate the bypass switch of the particular battery cell section to bypass the particular battery cell for the bypass period by shorting the first terminal to the second terminal;
determine that the bypass period for the particular battery cell has finished; and
in response to determining that the bypass period for the particular battery cell has finished, execute an activation sequence for the particular battery cell, the activation sequence being configured to allow current flow to the particular battery cell.

2. The system of claim 1, further comprising a power control switch coupled between the battery pack and a power source for controlling current flow to the battery pack from the power source, wherein the bypass sequence further comprises:
prior to transmitting the bypass signal, transmitting an open signal for opening the power control switch to prevent current flow from the power source to the battery pack during a remainder of the bypass sequence.

3. The system of claim 2, wherein the open signal is a first open signal, and wherein the bypass sequence comprises:
after transmitting the first open signal, transmitting a second open signal for opening a charging switch of the particular battery cell section to prevent current flow through the particular battery cell, the charging switch being positioned in series with the particular battery cell;
after transmitting the second open signal, transmitting the bypass signal; and
after transmitting the bypass signal, completing the bypass sequence by transmitting a close signal for closing the power control switch to allow current flow from the power source to the battery pack.

4. The system of claim 1, wherein the bypass period is a portion of a duty cycle for charging the battery pack.

5. The system of claim 1, wherein the activation sequence comprises:
transmitting a first open signal for opening a power control switch to prevent current flow from a power source to the battery pack during a remainder of the activation sequence;
after transmitting the first open signal, transmitting a second open signal for opening the bypass switch to prevent current from bypassing the particular battery cell;
after transmitting the second open signal, transmitting a first close signal for closing a charging switch of the particular battery cell section to allow current flow through the particular battery cell, the charging switch being positioned in series with the particular battery cell; and
after transmitting the first close signal, completing the activation sequence by transmitting a second close signal for closing the power control switch to allow current flow from the power source to the battery pack.

6. The system of claim 1, further comprising:
a startup relay configured to draw power from one or more battery cells in the battery pack to activate a boost circuit;
the boost circuit, wherein the boost circuit is configured to generate a drive voltage that is larger than an input voltage to the boost circuit; and
the drive circuit configured to apply the drive voltage generated by the boost circuit to the bypass switch of the particular battery cell to close the bypass switch.

7. The system of claim 1, further comprising a monitoring circuit configured to measure a voltage across the particular battery cell and transmit a measurement signal indicating the voltage to the control circuit, wherein the control circuit is configured to determine the capacity of the particular battery cell based on the voltage.

8. The system of claim 1, wherein the control circuit is configured to:
store voltages or charge states associated with the particular battery cell section over multiple charging cycles; and
determine the bypass period based on the stored voltages or charge states.

9. A method comprising:
determining, by a control circuit, a capacity of a particular battery cell in a particular battery cell section of a battery pack, wherein the particular battery cell section includes a bypass switch that is operable to short a first terminal of the particular battery cell section to a second terminal of the particular battery cell section, wherein the particular battery cell is coupled between the first terminal and the second terminal in the particular battery cell section;

determining, by the control circuit, whether the capacity of the particular battery cell is less than a predefined threshold;

in response to determining that the capacity of the particular battery cell is less than the predefined threshold, executing, by the control circuit, a bypass sequence for the particular battery cell, wherein the bypass sequence involves:

determining, based on the capacity of the particular battery cell, a bypass period for which to bypass the particular battery cell; and transmitting a bypass signal to a drive circuit, the drive circuit being configured to receive the bypass signal and responsively close the bypass switch of the particular battery cell section to bypass the particular battery cell for the bypass period by shorting the first terminal to the second terminal;

determining, by the control circuit, that the bypass period for the particular battery cell has finished; and in response to determining that the bypass period for the particular battery cell has finished, executing, by the control circuit, an activation sequence for the particular battery cell, the activation sequence being configured to allow current flow to the particular battery cell.

10. The method of claim 9, wherein the bypass sequence further comprises:

prior to transmitting the bypass signal, transmitting an open signal for opening a power control switch to prevent current flow from a power source to the battery pack during a remainder of the bypass sequence, the power control switch being coupled between the battery pack and the power source.

11. The method of claim 10, wherein the open signal is a first open signal, and wherein the bypass sequence comprises:

after transmitting the first open signal, transmitting a second open signal for opening a charging switch of the particular battery cell section to prevent current flow through the particular battery cell, the charging switch being positioned in series with the particular battery cell;

after transmitting the second open signal, transmitting the bypass signal; and after transmitting the bypass signal, completing the bypass sequence by transmitting a close signal for closing the power control switch to allow current flow from the power source to the battery pack.

12. The method of claim 9, wherein the bypass period is a portion of a duty cycle for charging the battery pack.

13. The method of claim 9, wherein the activation sequence comprises:

transmitting a first open signal for opening a power control switch to prevent current flow from a power source to the battery pack during a remainder of the activation sequence;

after transmitting the first open signal, transmitting a second open signal for opening the bypass switch to prevent current from bypassing the particular battery cell;

after transmitting the second open signal, transmitting a first close signal for closing a charging switch of the particular battery cell section to allow current flow through the particular battery cell; and after transmitting the first close signal, completing the activation sequence by transmitting a second close signal for closing the power control switch to allow current flow from the power source to the battery pack.

14. The method of claim 9, further comprising:

operating a startup relay to draw power from one or more battery cells of the battery pack during a startup phase of the battery pack to activate a boost circuit;

operating the boost circuit to generate a drive voltage that is larger than an input voltage to the boost circuit; and operating the drive circuit to apply the drive voltage generated by the boost circuit to the bypass switch of the particular battery cell to close the bypass switch.

15. The method of claim 9, further comprising:

measuring a voltage across the particular battery cell; and transmitting a measurement signal indicating the voltage to the control circuit, wherein the control circuit is configured to determine the capacity of the particular battery cell based on the voltage.

16. The method of claim 9, further comprising:

storing voltages or charge states associated with the particular battery cell over multiple charging cycles; and determining the bypass period based on the stored voltages or charge states.

17. A method comprising:

determining, by a first control circuit associated with a first battery pack, that a battery cell of the first battery pack is to be bypassed for a bypass period based on a capacity of the battery cell; and in response to determining that the battery cell is to be bypassed for the bypass period:

executing, by the first control circuit, a first bypass sequence configured to bypass the battery cell for the bypass period; and transmitting, by the first control circuit, a bypass notification to a second control circuit associated with a second battery pack, wherein the second control circuit is configured to:

receive the bypass notification; and in response to receiving the bypass notification, synchronize a second bypass sequence with the first bypass sequence, the second bypass sequence being configured to bypass another battery cell in the second battery pack.

18. The method of claim 17, wherein the bypass notification indicates the bypass period, and wherein the second bypass sequence is configured to bypass the another battery cell for the bypass period based on the bypass notification.

* * * * *